United States Patent [19]

Matsui

[11] Patent Number: 5,463,293

[45] Date of Patent: Oct. 31, 1995

[54] MOTOR CONTROL DEVICE

[75] Inventor: Tomoji Matsui, Tokyo, Japan

[73] Assignee: NEC Corporation, Japan

[21] Appl. No.: 186,422

[22] Filed: Jan. 25, 1994

[30] Foreign Application Priority Data

Jan. 27, 1993 [JP] Japan ................................. 5-011317

[51] Int. Cl.$^6$ ..................................................... H02P 6/02
[52] U.S. Cl. ............................ 318/285; 318/280; 318/254
[58] Field of Search ...................................... 318/254, 257, 318/280–289, 370–389, 780–799, 800–832, 260–266, 603, 430, 440–466; 360/70–87; 354/400–436

[56] References Cited

U.S. PATENT DOCUMENTS

| 4,367,435 | 1/1983 | Bailey et al. | 318/280 X |
| 4,412,158 | 10/1983 | Jefferson et al. | 318/257 |
| 4,514,670 | 4/1985 | Fassel et al. | 318/467 |
| 4,542,633 | 9/1985 | Hirooka et al. | 318/282 |
| 4,549,120 | 10/1985 | Banno et al. | 318/254 |
| 4,686,598 | 8/1987 | Herr | 318/286 |
| 4,706,005 | 11/1987 | Iwako | 318/603 |
| 4,713,591 | 12/1987 | McCloskey | 318/257 |
| 4,922,168 | 5/1990 | Waggamon et al. | 318/286 |
| 4,928,044 | 5/1990 | Shiba | 318/364 |
| 4,933,611 | 6/1990 | Albanesius et al. | 318/285 |
| 4,965,502 | 10/1990 | Ogasawara | 318/628 |
| 5,132,598 | 7/1992 | Albanesius et al. | 318/285 |
| 5,162,711 | 11/1992 | Heckler | 318/264 |
| 5,239,331 | 8/1993 | Kobe et al. | 318/365 |
| 5,285,139 | 2/1994 | Ogasawara | 318/466 |

FOREIGN PATENT DOCUMENTS

| 352728 | 1/1990 | European Pat. Off. |
| 1115089 | 11/1954 | France . |
| 10841 | 1/1985 | Japan . |
| 77853 | 4/1985 | Japan . |

Primary Examiner—Paul Ip
Attorney, Agent, or Firm—Ostrolenk, Faber, Gerb & Soffen

[57] ABSTRACT

A motor control device which prevents runaway reverse rotation arising from failure of detection of a rotational speed drop of a motor to a preset value when reverse torque braking is applied. In the first invention, rotation drop detection section 5 detects, from rotational pulses P1 generated by rotational pulse generation section 4, a rotational speed drop to the preset value and outputs rotation drop detection pulse P2. Timer section 6 is activated by rotation stopping signal S1 and outputs pulse P3 upon lapse of the maximum rotation stopping required time of the motor. Control section 1 delivers, upon reception of rotation stopping signal S1 from the outside, a signal to apply reverse torque to motor drive section 2 and then delivers, upon reception of rotation drop detection pulse P2 or pulse P3, an instruction to stop reverse torque. In the second invention, timer section 7 is additionally provided. If the motor enters reverse rotation after a motor rotational speed drop is not detected, control section 1 delivers an instruction to apply forward torque by pulse P3 and timer section 7 is also activated by pulse P3. When a preset time elapses, timer section 7 outputs, to control section 1, pulse P4, in response to which control section 1 delivers an instruction to again apply reverse torque. Control section 1 delivers, when the motor rotational speed becomes lower than a preset value, another instruction to cancel torque application.

7 Claims, 3 Drawing Sheets

MOTOR CONTROL DEVICE

BACKGROUND OF THE INVENTION

1. Field of the Invention

This invention relates to a motor control device, and more particularly to a motor control device which drives the reel motor of a magnetic recording and/or reproduction apparatus, the spindle motor of a magnetic disk apparatus or the like to stop rotation of the motor quickly.

2. Description of the Prior Art

FIG. 1 is a block diagram showing an example of the construction of a conventional motor control device of the type described above and particularly shows the construction for putting the motor in reverse torque to quickly stop the motor. Here, motor drive section 2 drives motor 3 in response to drive current control signal C1 and torque application direction control signal C2 supplied thereto from control section 1. Separately, rotational pulse generation section 4 generates rotational pulse signal P1 of a frequency which increases in proportion to the rotation speed of motor 3. Rotational pulse generation section 4 includes, for example, a disk mounted on the rotary shaft of motor 3 and having slits formed equidistant from each other therein so that light passing through the slits is detected to generate rotational pulse signal P1. Rotation drop detection section 5 counts the frequency of rotational pulse signal P1 using clock pulses of a fixed period, compares the count value with a predetermined preset value upon stopping control and sends out rotation drop detection pulse P2 to control section 1 when the speed drops below the predetermined preset value.

Operation of the conventional motor control device is described below.

When rotation stopping signal S1 which indicates stopping of rotation of motor 3 which is rotating in a forward direction is received from the outside, control section 1 sends out torque application direction control signal C2, which indicates reverse torque, to motor drive section 2 while keeping drive current control signal C1 as is to put motor 3 into reverse torque. It is to be noted that rotation stopping signal S1 is a pulse signal which is generated, for example, by depression of a rotation stopping button or the like provided on the apparatus. Thereafter, control section 1 receives rotation drop detection pulse P2 from rotation drop detection section 5 when the rotation speed of motor 3 drops below the predetermined preset value by reverse torque, and instructs motor drive section 2 to stop the application of torque by way of drive current control signal C1. Rotation of motor 3 is stopped quickly in this manner.

It is to be noted that the rotation speed to be detected by rotation stop detection section 5 is set in advance so that, when control section 1 receives rotation drop detection pulse P2 and delivers an instruction to stop application of torque, rotation of motor 3 begins to stop at an optimum low speed, at which, for example, in a disk apparatus, the disk can be removed from a turntable to a tray with no damage.

In the conventional motor control device described above, in order to stop rotation of the motor rotating in forward torque quickly, the motor is put into reverse torque and the time at which the rotation speed of the motor drops to a predetermined speed of rotation is detected from rotational pulses to effect stopping of the motor. However, since the rotation speed of the motor decreases quickly upon stopping and since, as a result, the frequency of the rotational pulses also varies rapidly in an increasing direction, when it is tried to detect a drop of rotation speed, it sometimes occurs that, depending on the relationship in timing between the period of the rotational pulses and the count value of the clock pulses, the motor reaches its stopping point while the predetermined rotation speed is not detected. Since reverse torque still continues, the motor rotates reversely into a runaway condition due to reverse torque, resulting in failure to effect recording or reproduction as planned.

SUMMARY OF THE INVENTION

The present invention provides a motor control device which can prevent runaway reverse rotation of a motor even when a drop of the rotation speed of the motor to a predetermined value is not detected as described above.

According to one aspect of the present invention, there is provided a motor control device, which comprises a rotational pulse generation section for generating a rotational pulse signal of a frequency conforming to the rotation speed of a motor, a rotation drop detection section for detecting when the period of the rotational pulse signal is reduced to a predetermined preset value representative of a drop in the rotation speed and outputting a corresponding pulse, a timer section for starting operation in response to a rotation stopping signal supplied thereto from the outside and outputting a pulse when the maximum rotation stopping required time of the motor elapses, a control section for instructing, when the rotation stopping signal is received, the motor to then apply reverse torque to the direction of rotation of the motor and then instructing, when the pulse representative of a drop of rotation or the pulse outputted from the timer section is received, the motor to stop the application of reverse torque, and a motor drive section for driving the motor in response to instructions from the control section.

According to another aspect of the present invention, there is provided a motor control device, which comprises a rotational pulse generation section for generating a rotational pulse signal of a frequency conforming to the rotation speed of a motor, a rotation drop detection section for detecting when the period of the rotational pulse signal is reduced to a predetermined preset value representative of a drop of the rotation speed and outputting a corresponding pulse, a first timer section for starting operation in response to a rotation stopping signal supplied thereto from the outside and outputting a pulse when the maximum rotation stopping required time of the motor elapses, a second timer section for starting operation in response to the pulse outputted from the first timer section and outputting a pulse when a preset time has elapsed, a control section for instructing, when the rotation stopping signal is received, the motor to then apply reverse torque to the direction of rotation of the motor and then instructing, when the pulse outputted from the rotation drop detection section is received, the motor to stop the application of reverse torque or for instructing, when the rotation stopping signal is received, the motor to then apply reverse torque to the direction of rotation, then instructing, when the pulse outputted from the first timer section is received, the motor to apply torque in the direction opposite to that of the reverse torque, thereafter instructing, when the pulse outputted from the second timer section is received, the motor to again apply reverse torque, and then instructing, when the pulse outputted from the rotation drop detection section is received, the motor to stop the application of reverse torque, and a motor drive section for driving the motor in response to instructions from the control section, the preset time of the second timer section being the time from the point of time when the second timer section starts operation in response to the pulse from the first timer section to another point of time when the motor is accelerated in the forward torque direction until the rotation speed thereof reaches a designated rotation speed higher than the preset value of the rotation drop detection section.

In both of the motor control devices, the preset value of the rotation drop detection section may be set to the optimum low speed at which the rotation speed of the motor when the control section instructs the motor to stop application of reverse torque has no influence upon succeeding processing.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

The present invention is described below with reference to the drawings.

Figure 1:
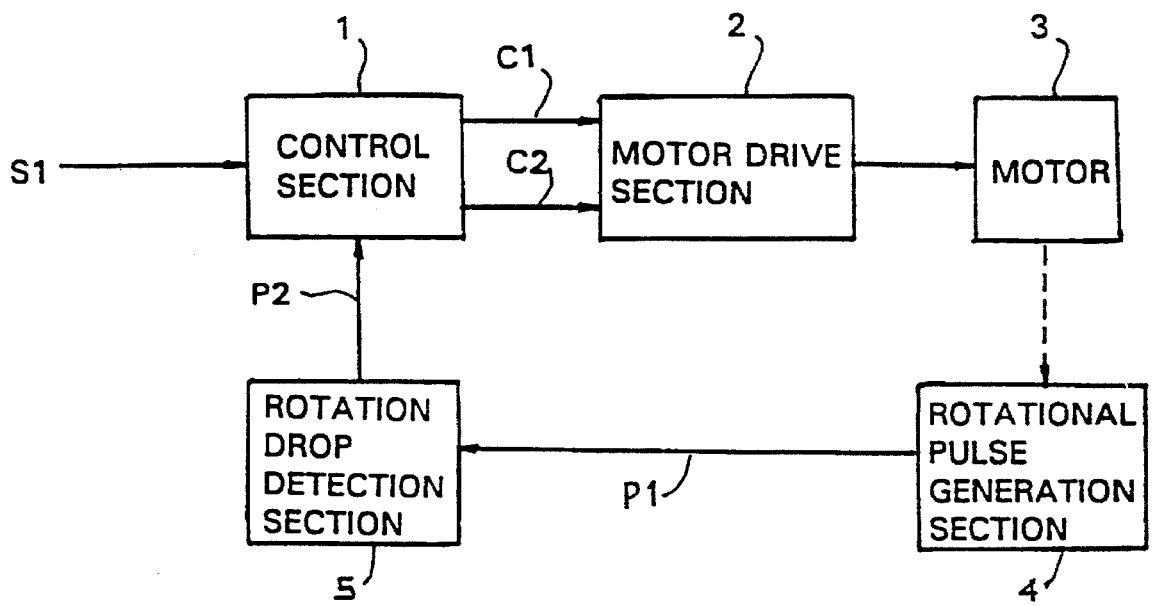
FIG. 1 is a block diagram showing the construction of a conventional example of a motor control device.
Figure 2:
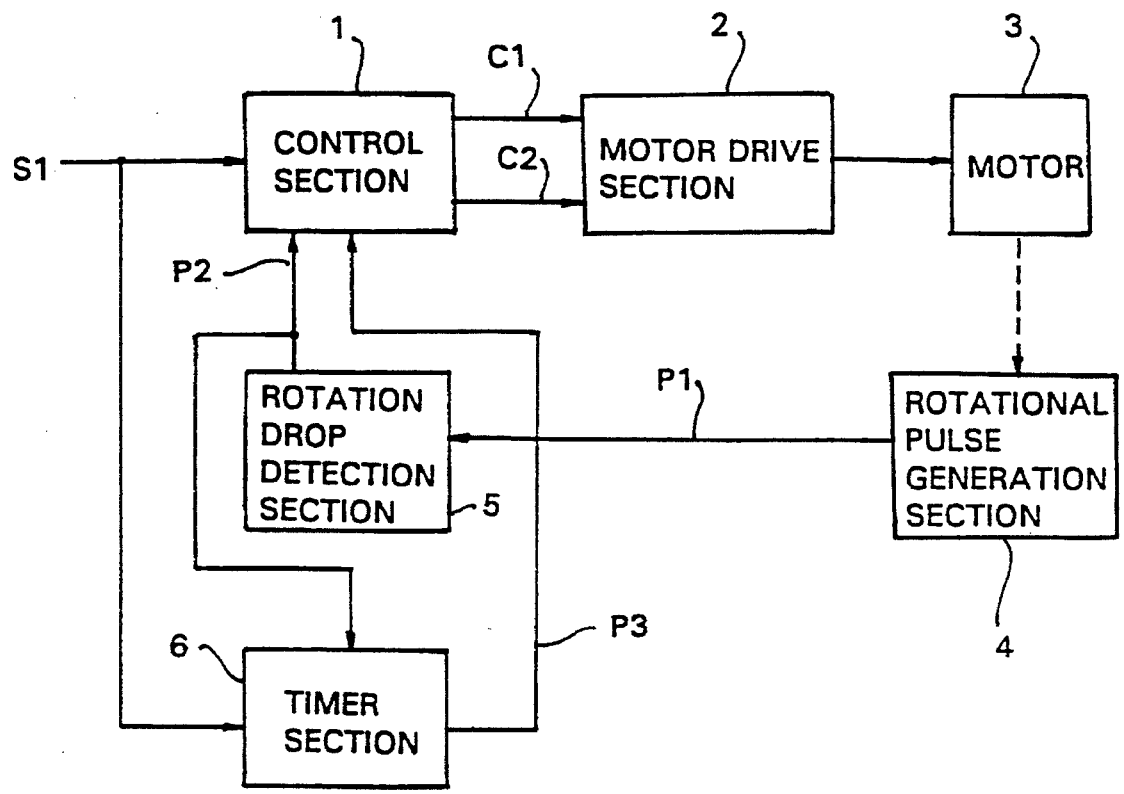
FIG. 2 is a block diagram showing a first embodiment of the present invention.

FIG. 2 is a block diagram showing the first embodiment of the present invention. In FIG. 2, the same components as in the conventional motor control device shown in FIG. 1 are denoted by the same reference characters, and description thereof is not reiterated herein. The motor control device further includes timer section 6 in order to cope with the case when it cannot be detected that the rotation speed of the motor has dropped below a predetermined value set in advance.

Normally, when rotation stopping signal S1, which indicates stopping of rotation of the motor during forward rotation, is received, control section 1 instructs motor drive section 2 of application of reverse torque by way of torque application direction control signal C2 to put motor 3 into reverse torque. Thereafter, when rotation drop detection pulse signal P2 is received from rotation drop detection section 5, control section 1 instructs motor drive section 2 of stopping of application of torque by way of drive current control signal C1. The preset value of rotation drop detection section 5 is similar to that in the conventional example described above. Meanwhile, timer section 6 starts counting upon reception of rotation stopping signal S1 and then outputs pulse P3 when a preset time elapses. Separately, when rotation drop detection pulse signal P2 from rotation drop detection section 5 is received, timer section 6 is reset. Here, the time set to timer section 6 is the maximum value of the time required to stop rotation of motor 3 when control section 1 performs normal rotation stopping control in response to rotation stopping signal S1.

Next, operation when rotation drop detection section 5 fails to detect a drop in rotation speed of the motor to the preset value is described.

Figure 4A:
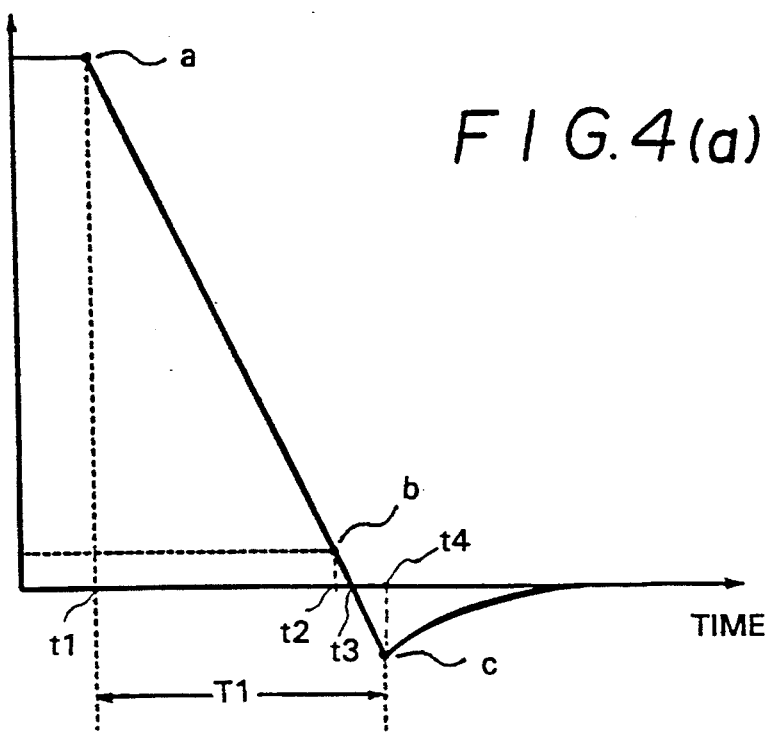
FIGS. 4(a) and 4(b) are diagrams showing variations of the motor rotation speed and illustrating operation of the first and second embodiments, respectively.

FIG. 4(a) illustrates a variation of the rotation speed upon stopping of motor 3 in the first embodiment. First, at time t1, rotation stopping signal S1 is received (point a) and motor 3 is put into reverse torque. If it is assumed that, when the rotation speed of motor 3 drops below a value set by rotation drop detection section 5 at time t2 (point b), rotation drop detection section 5 fails to detect this, then motor 3 continues reverse torque. Consequently, motor 3 enters reverse rotation after its zero-speed point (time t3). Thereafter, when preset time T1 of timer section 6 elapses at time t4 (point c), that is, when the maximum value of the time required to stop rotation of motor 3 elapses, timer section 6 outputs pulse P3. Upon reception of pulse P3, control section 1 delivers an instruction to stop application of torque by way of drive current control signal C1. Whereas motor 3 is being rotated reversely by reverse torque, rotation soon stops naturally as seen from FIG. 4(a). As a result, runaway reverse rotation of the motor can be prevented.

Figure 3:
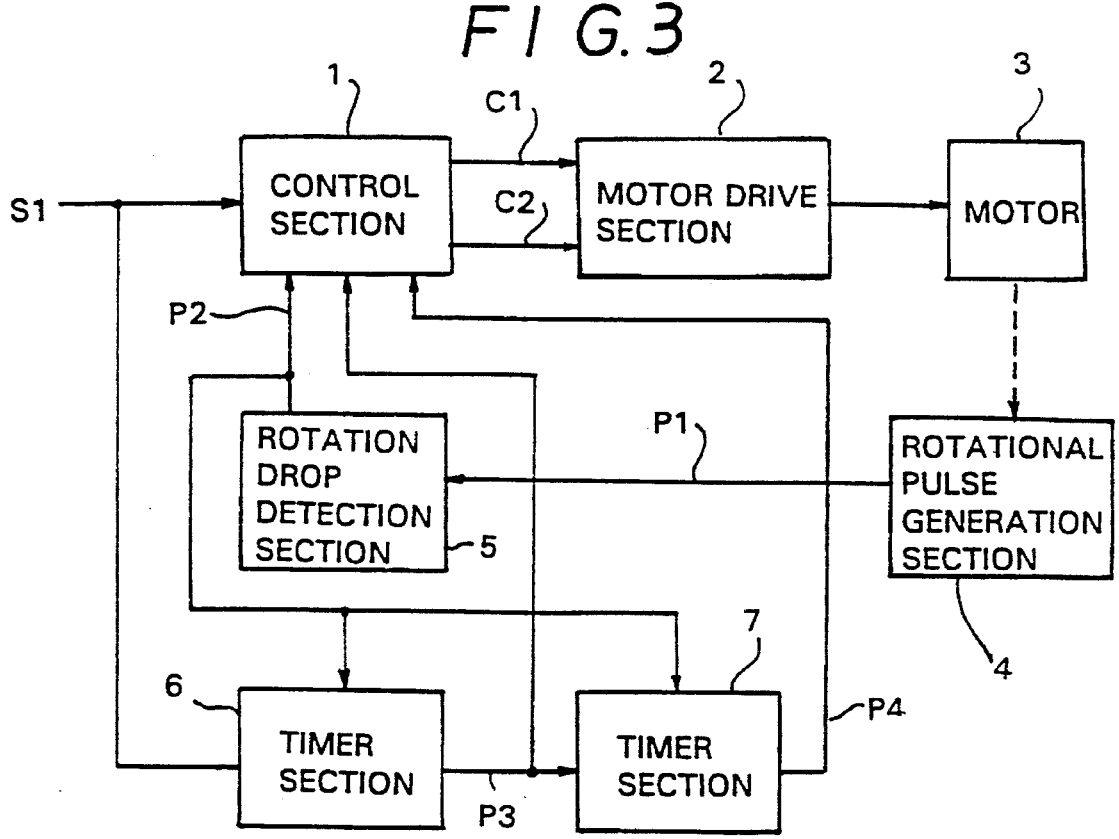
FIG. 3 is a block diagram showing a second embodiment of the present invention.

Next, FIG. 3 is a block diagram showing the second embodiment of the present invention.

In the first embodiment described above, even if control section 1 delivers an instruction to stop application of torque by way of pulse P3 from timer 6 at time t4, time is required before rotation of motor 3 stops naturally, since motor 3 is rotating reversely at time t4 as seen from FIG. 4(a). In order to solve this problem, timer section 7 is provided. Timer section 7 starts operation when pulse P3 is received from timer section 6, and outputs pulse P4 to control section 1 when a preset time elapses. Separately, timer section 7 is reset when rotation drop detection pulse P2 is received. The other elements of the motor control device are the same as those of the first embodiment.

Next, operation when rotation drop detection section 5 fails to detect a drop of the rotation speed of the motor to a preset value as in the first embodiment is described.

Figure 4B:
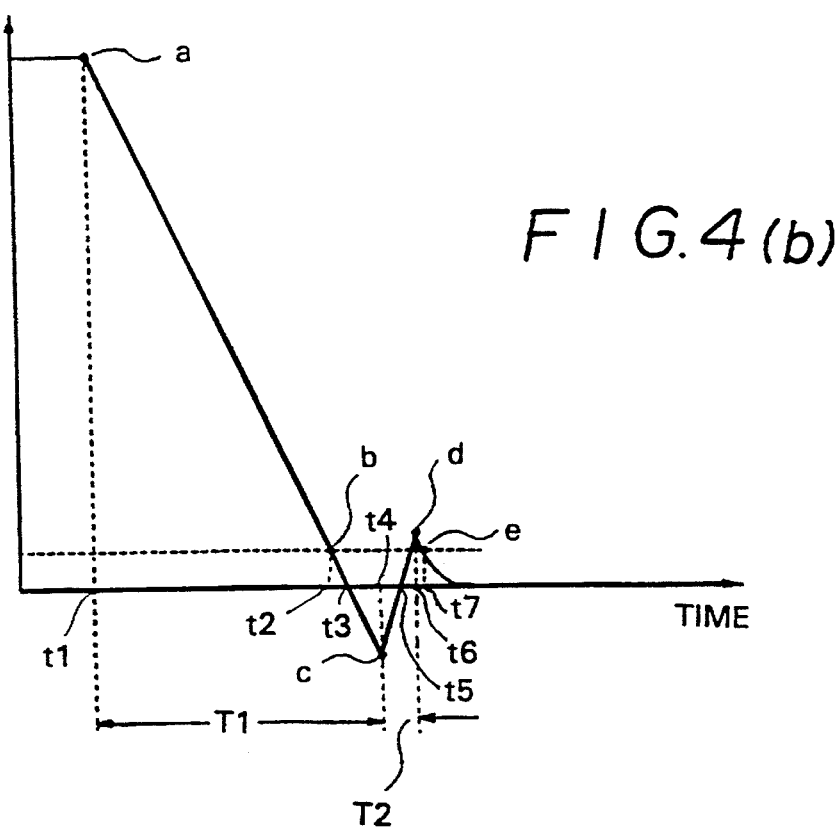

FIG. 4(b) illustrates a variation in the rotation speed upon stopping of motor 3 in the second embodiment. First, at time t1, motor 3 receives rotation stopping signal S1 (point a) and is put into reverse torque condition. When the rotation speed of motor 3 drops below the preset value of rotation drop detection section 5 at time t2 (point b), if rotation drop detection section 5 fails to detect the drop, motor 3 continues reverse torque. Consequently, motor 3 enters reverse rotation past its zero-speed point (time t3). Thereafter, when preset time T1 of timer section 6 elapses at time t4 (point c), that is, when the maximum value of the time required to stop rotation of motor 3 elapses, timer 6 outputs pulse P3. Upon reception of pulse P3, control section 1 instructs motor 3, which is rotating reversely, of the application of forward torque by way of drive current control signal C1. Meanwhile, timer section 7 starts operation in response to pulse P3, and when preset time T2 elapses at time t6 (point d) past a second zero-speed point (time t5) of motor 3, timer section 7 sends out pulse P4 to control section 1. Upon reception of pulse P4, control section 1 delivers an instruction to apply reverse torque to motor 3, which is rotating in forward torque. By causing motor 3 to output reverse torque or forward torque in a timed relationship in this manner, the rotation speed of motor 3 can be varied close to the preset value of rotation drop detection section 5. Accordingly, rotation drop detection section 5 detects without fail the time when the rotation speed of motor 3 drops to the predetermined preset value at time t7 (point e) and outputs pulse P2. Upon reception of pulse P2, control section 1 delivers an instruction to stop the application of torque by way of drive current control signal C1. Thus, when it cannot be detected in advance that the rotation speed of motor 3 drops to the predetermined value, the time required to stop rotation can be decreased and runaway rotation can be prevented.

It is to be noted that, in this instance, preset time T2 of timer section 7 is set to an optimum value in accordance with the motor, the motor load and some other parameters from point c to another point d at which the rotation speed of motor 3 in the forward direction exceeds the preset value of rotation drop detection section 5. As an example, when a motor having a steady rotation speed of 59.9 rps stops rotation in 0.65 seconds at the minimum and in 0.69 seconds at the maximum as a result of reverse driving, preset time T1 of timer section 6 is 0.69 seconds, and preset time T2 of timer section 7 is 0.12 seconds. Separately, a slit disk having 64 slits is employed for rotational pulse generation section 4 to detect the frequency of rotational pulse of 14.52 milliseconds (the speed of rotation is 1.08 rps).

While the foregoing description relates to the case wherein a motor which is rotating forwardly is controlled to be stopped, it is also possible to stop rotation of a motor, which is rotating reversely, by reversing the direction of torque application.

Although certain preferred embodiments of the present invention have been shown and described in detail, it should be understood that various changes and modifications may be made therein without departing from the scope of the appended claims.

What is claimed is:

1. A motor control device for a motor, the motor having a rotation speed, a direction of rotation and a maximum rotation stopping required time equal to a preset maximum time required for the motor to stop upon application of a reverse torque, the control device comprising:

a rotational pulse generation section for generating a rotational pulse signal of a period conforming to the rotation speed of a motor;

a rotation drop detection section for detecting when the period of the rotational pulse signal is reduced to a predetermined preset value representative of a drop of the rotation speed and outputting a corresponding pulse;

a timer section for starting a timing operation in response to a rotation stopping signal supplied thereto from the outside and outputting a pulse when the time elapsed during the timing operation equals the maximum rotation stopping required time of said motor;

a control section for instructing, when the rotation stopping signal is received, said motor to apply reverse torque to the direction of rotation of said motor and then instructing, when the pulse representative of a drop of rotation or the pulse outputted from said timer section is received, said motor to stop the application of reverse torque; and a motor drive section for driving said motor in response to instructions from said control section.

2. A motor control device as claimed in claim 1, wherein the preset value of said rotation drop detection section is set to an optimum low speed at which the rotation speed of said motor when said control section instructs said motor to stop the application of reverse torque has no influence upon succeeding processing.

3. A motor control device as claimed in claim 1, wherein said timer section is reset after outputting said pulse or when said corresponding pulse is received from said rotation drop detection section.

4. A motor control device, comprising:

a rotational pulse generation section for generating a rotational pulse signal of a period conforming to the rotation speed of a motor;

a rotation drop detection section for detecting when the period of the rotational pulse signal is reduced to a predetermined preset value representative of a drop of the rotation speed and outputting a corresponding pulse;

a first timer section for starting operation in response to a rotation stopping signal supplied thereto from the outside and outputting a pulse when the maximum rotation stopping required time of said motor elapses;

a second timer section for starting operation in response to the pulse outputted from said first timer section and outputting a pulse when a preset time has elapsed;

a control section for instructing, when the rotation stopping signal is received, said motor to apply reverse torque to the direction of rotation of said motor then and then instructing, when the pulse outputted from said rotation drop detection section is received, said motor to stop the application of reverse torque, or for instructing, when the rotation stopping signal is received, said motor to apply reverse torque to the direction of rotation then, then instructing, when the pulse outputted from said first timer section is received, said motor to apply torque in the direction opposite to that of the reverse torque, thereafter instructing, when the pulse outputted from said second timer section is received, said motor to apply reverse torque again, and then instructing, when the pulse outputted from said rotation drop detection section is received, said motor to stop the application of reverse torque; and a motor drive section for driving said motor in response to instructions from said control section;

the preset time of said second timer section being a time from a point of time when said second timer section starts operation in response to the pulse from said first timer section to another point of time when said motor is accelerated in forward torque direction until the rotation speed thereof reaches a designated speed of rotation higher than the preset value of said rotation drop detection section.

5. A motor control device as claimed in claim 4, wherein the preset value of said rotation drop detection section is set to an optimum low speed at which the rotation speed of said motor when said control section instructs said motor to stop the application of reverse torque has no influence upon succeeding processing.

6. A motor control device as claimed in claim 4, wherein said first timer section is reset after outputting said pulse or when said corresponding pulse is received from said rotation drop detection section.

7. A motor control device as claimed in claim 4, wherein said second timer section is reset after outputting said pulse or when said corresponding pulse is received from said rotation drop detection section.

* * * * *